UNITED STATES PATENT OFFICE.

ARTHUR A. BACKHAUS, OF BALTIMORE, MARYLAND, ASSIGNOR TO U. S. INDUSTRIAL ALCOHOL CO., A CORPORATION OF WEST VIRGINIA.

LIQUID FUEL.

1,313,158.  Specification of Letters Patent.  Patented Aug. 12, 1919.

No Drawing.   Application filed November 22, 1917.   Serial No. 203,400.

*To all whom it may concern:*

Be it known that I, ARTHUR A. BACKHAUS, of Baltimore, in the State of Maryland, have invented a certain new and useful Improvement in Liquid Fuel, and do hereby declare that the following is a full, clear, and exact description thereof.

My invention relates particularly to fuels designed to be used in any desired manner, but it has application especially to fuels adapted to be used as a source of power, as for example fuels for burners and motor fuels.

The object of my invention is to provide a fuel containing a petroleum hydrocarbon, as well as alcohol, and an ingredient adapted to blend the same or form a solution with the hydrocarbon and alcohol.

A further object of my invention is to provide a fuel of this character, which is of such a nature that only a very small quantity of the third ingredient is found necessary.

A further object is to provide a fuel of this character which contains a large percentage of the petroleum hydrocarbon, notwithstanding the small percentage of the third ingredient.

A further object of my invention is to provide a fuel of this character in whch the third ingredient is an organic chlorin compound.

Another object is to provide such a fuel in which the third ingredient is chloroform.

Further objects of my invention will appear from the detailed description thereof contained hereinafter.

While my invention is capable of being carried out in different ways, for the purpose of illustration I shall describe only certain ways of carrying out the same herein.

For example, a fuel made in accordance with my invention may be comprised of:—

25 parts by volume of ethyl alcohol.
25 parts by volume of kerosene.
25 parts by volume of gasolene, and
9 parts by volume of chloroform.

Instead of the chloroform above referred to, however, I may use any one of a number of other organic chlorin compounds, such for example as carbon tetrachlorid, tetrachlorethane, trichlorethane.

It will be understood, also, that, instead of using gasolene and kerosene referred to in the above example, I may use only gasolene.

While I have described my invention above in detail, I wish it to be understood that many changes may be made therein without departing from the spirit thereof.

I claim:

1. A fuel comprising a petroleum distillate, an alcohol and an organic chlorin compound.
2. A fuel comprising a petroleum distillate, an alcohol and a chlorhydrocarbon.
3. A fuel comprising a petroleum distillate, an alcohol and chloroform.
4. A fuel comprising gasolene, an alcohol and an organic chlorin compound.
5. A fuel comprising gasolene, an alcohol and a chlorhydrocarbon.
6. A fuel comprising gasolene, an alcohol and chloroform.
7. A fuel comprising gasolene, kerosene, an alcohol and an organic chlorin compound.
8. A fuel comprising gasolene, kerosene, an alcohol and a chlorhydrocarbon.
9. A fuel comprising gasolene, kerosene, an alcohol and chloroform.
10. A fuel comprising a petroleum distillate, ethyl alcohol and an organic chlorin compound.
11. A fuel comprising a petroleum distillate, ethyl alcohol and a chlorhydrocarbon.
12. A fuel comprising a petroleum distillate, ethy alcohol and chloroform.
13. A fuel comprising gasolene, ethyl alcohol and an organic chlorin compound.
14. A fuel comprising gasolene, ethyl alcohol and a chlorhydrocarbon.
15. A fuel comprising gasolene, ethyl alcohol and chloroform.
16. A fuel comprising gasolene, kerosene, ethyl alcohol and an organic chlorin compound.
17. A fuel comprising gasolene, kerosene, ethyl alcohol and a chlorhydrocarbon.
18. A fuel comprising gasolene, kerosene, ethyl alcohol and chloroform.

In testimony that I claim the foregoing I have hereunto set my hand.

ARTHUR A. BACKHAUS.